March 12, 1935.
G. P. DESPRET
1,994,387
HOLLOW TRANSPARENT UNIT FOR CONSTRUCTION
Filed April 5, 1934
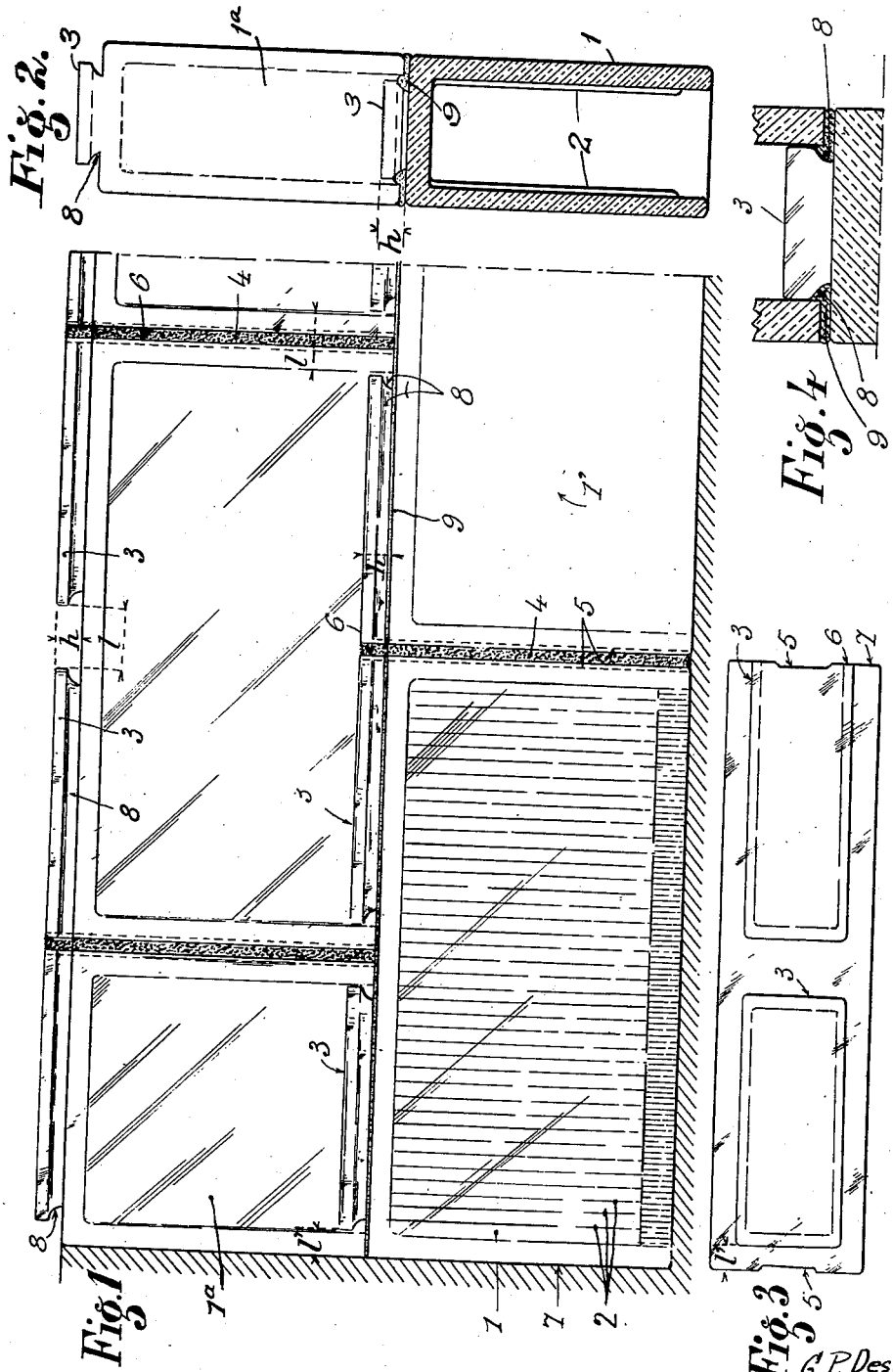
G. P. Despret
INVENTOR
By: Marks & Clerk
Attys.

Patented Mar. 12, 1935

1,994,387

UNITED STATES PATENT OFFICE 1,994,387

HOLLOW TRANSPARENT UNIT FOR CONSTRUCTION

Georges Paul Despret, Paris, France, assignor to Compagnies Reunies des Glaces et Verres Speciaux du Nord de la France, Boussois-sur-Sambre, Nord, France, a French company Application April 5, 1934, Serial No. 719,223
In France June 26, 1933

5 Claims. (Cl. 72—41)

The present invention relates to hollow transparent units employed for construction.

There have been already utilized, for construction, hollow units consisting of glass or other transparent material, which units have the form of blocks of parallelopipedon shape and are open on their lower faces. The units are assembled together by means of joints of cement or like material. It has already been proposed, in order to facilitate the assembling, to provide each unit, on its upper horizontal face, with one or more tenons adapted for insertion into the unit situated immediately above.

Such tenons serve only to provide for a fitting which will prevent the units from slipping in any direction during the assembling, and without any really serious advantage for the actual execution of the assembling work, or for the appearance of the sealing joints. In fact, the cement used to hold the said units together will rise upon the interior of the walls or will extend upon their surface, and thus it will not form regular joints; these latter have unsightly rough edges, which form the principal reason for the diminished commercial value of such units of construction.

The present invention has for its object a unit of parallelôpipedon shape, hollow and transparent, for constructions, which is chiefly characterized by the fact that it comprises, upon its upper assembling face, one or more tenons having a relatively considerable height and provided, on that part of their entire periphery which is to be engaged by the upper unit, with a groove adapted to form, with the internal surface of the upper unit, a space in which the cement of the joint may spread out and which prevents the said cement from rising into the interior of the upper unit above the tenon and from forming rough edges.

In the accompanying drawing, which is given solely by way of example:

Fig. 1 is an elevational view of a portion of construction consisting of unit parts according to the invention.

Fig. 2 is a vertical section on the line 2—2 of Fig. 1.

Fig. 3 is a plan view of one of the units.

Fig. 4 is a partial vertical section on a larger scale, showing the grooves of one of the assembling tenons.

According to the example of execution represented, the construction is formed by the superposition of several horizontal rows of unit parts 1—1'... which are placed end-to-end in each row. From one row to another, the units are preferably displaced by half the length of a unit. At each end of the rows, each alternate row comprises a half-unit $1^a$.

All of the said units consist of hollow masses, of parallelopipedon shape, of glass or like transparent material.

Such units, which may comprise any external or internal decoration, for example, vertical internal striated parts 2, are open on their lower face. Their upper face comprises one or more assembling tenons 3 whose height $h$ is relatively considerable, each of these being adapted for insertion into one of the units situated immediately above. The two tenons of each normal unit are separated, at their adjacent ends, by a distance $l$ which is sufficient to provide for the placing of the vertical walls of the two units located just above, and of the vertical filling 4 of cement, whose width is chosen according to the decoration desired and which is maintained by means of vertical grooves 5 formed in the units. The lateral end faces 6 of the tenons 3 are, on the contrary, in the same plane as the vertical ends 7 of the unit.

For the units at the ends of the rows, the single tenon (half-unit $1^a$) or the end tenon (unit 1) is set back from the end 7 by the thickness $l'$ of the wall of the unit situated just above.

In conformity with the invention, the foot of each tenon 3 comprises, on that part of its periphery which is to be engaged by the upper unit, a groove 8 which gives to the tenon a T-shaped vertical section (Fig. 4).

By the simple pressure of the upper unit, the cement 9 of each horizontal joint tends to spread out in the direction which is most favourable to the movement, that is, horizontally. The cement thus fills the space formed by the groove 8 between the tenon 3 and the walls of the upper element, and will not rise along the said walls by reason, on the one hand, of the considerable volume of the space thus formed, and also due to the shape of the said space, which renders all vertical movement of the cement practically impossible.

On the other hand, owing to the groove 8 of the tenons, this latter, when it is filled with cement, will form a veritable anchoring between the two units.

Due to the invention, it is not necessary to take any particular care in proportioning the quantity of cement used for the sealing; the joints are smooth and regular, they have the smallest possible thickness, and the assembling is effected in a very short time.

The advantage of the unit thus consists in the improvements made in the tenons which permits to obtain a work which is simple, rapid and practically well executed.

Obviously, the invention is not limited to the method of execution represented and described, which has been chosen solely by way of example.

Having now described my invention what I claim as new and desire to secure by Letters Patent is:

1. A hollow and transparent unit for construction, the lower face of which is open and the upper face of which is provided with at least one relatively high tenon adapted to be inserted into the upper adjacent unit, the foot of said tenon being provided with a lateral groove extending all along that portion of its periphery which is engaged by said upper unit.

2. A hollow and transparent unit for construction, the lower face of which is open and the upper face of which is provided with two relatively high tenons adapted to be inserted respectively into two upper adjacent units, the foot of each of said tenons being provided with a lateral groove extending all along that portion of its periphery which is engaged by said upper unit.

3. A construction comprising juxtaposed hollow and transparent units, the lower face of each of said units being open and its upper face being provided with at least one tenon which is adapted to be inserted into the upper adjacent unit and the foot of which is provided with a lateral groove extending all along that portion of its periphery which is engaged by said upper unit, and joints of cement between said units and filling said grooves.

4. A construction as claimed in claim 3 wherein said groove is adapted to form with the internal surface of the upper unit a space in which the cement of the joint may be spread out.

5. A construction comprising superposed rows of juxtaposed hollow and transparent units displaced by half the length of a unit from one row to another, the lower face of said units being open while their upper face is provided with two tenons respectively inserted into the two units of the two immediately above, the foot of said tenons being surrounded by a lateral groove on that part of their periphery which is engaged by said upper units, and fillings of cement in said grooves and between said rows.

GEORGES PAUL DESPRET.